US012117057B2

United States Patent
Wu et al.

(10) Patent No.: US 12,117,057 B2
(45) Date of Patent: Oct. 15, 2024

(54) ELECTRO MECHANICAL BRAKE AND ELECTRICAL ACTUATOR THEREOF

(71) Applicant: Haldex Brake Products Aktiebolag, Landskrona (SE)

(72) Inventors: Gang Wu, Shanghai (CN); Anders Lindqvist, Shanghai (CN); Anders Nilsson, Shanghai (CN); Zenglai Song, Shanghai (CN); Xianbin Dong, Shanghai (CN); Yibo Fei, Shanghai (CN)

(73) Assignee: HALDEX BRAKE PRODUCTS AKTIEBOLAG, Landskrona (SE)

( * ) Notice: Subject to any disclaimer, the term of this patent is extended or adjusted under 35 U.S.C. 154(b) by 975 days.

(21) Appl. No.: 17/035,915

(22) Filed: Sep. 29, 2020

(65) Prior Publication Data
US 2021/0025467 A1    Jan. 28, 2021

Related U.S. Application Data

(63) Continuation of application No. PCT/EP2019/058054, filed on Mar. 29, 2019.

(30) Foreign Application Priority Data

Mar. 30, 2018  (CN) .......................... 201810296353.9

(51) Int. Cl.
*B60T 13/74*    (2006.01)
*F16D 65/00*   (2006.01)
(Continued)

(52) U.S. Cl.
CPC ......... *F16D 65/18* (2013.01); *F16D 65/0068* (2013.01); *F16D 65/78* (2013.01);
(Continued)

(58) Field of Classification Search
CPC ...... F16D 65/18; F16D 65/0068; F16D 65/78; F16D 2121/24; F16D 2125/50; F16D 2131/02; H02K 7/1023; H02K 7/1025
See application file for complete search history.

(56) References Cited

U.S. PATENT DOCUMENTS 6,700,253 B1 *   3/2004   Ohnuma ................ H02K 15/02
                                                            310/99
6,806,602 B2    10/2004   Hilzinger
(Continued)

FOREIGN PATENT DOCUMENTS

DE    102007 036 070 A1    2/2009
DE    202008 014 682 U1    2/2009
(Continued)

OTHER PUBLICATIONS

International Search Report issued by the International Searching Authority for PCT application PCT/EP2019/058054 on Jun. 21, 2019.

*Primary Examiner* — Nicholas J Lane
(74) *Attorney, Agent, or Firm* — Price Heneveld LLP

(57) ABSTRACT

The present invention provides an electro mechanical brake (1) comprising an electrical actuator (2) which can simplify the structure of the electro mechanical brake (1) by integrating a control module (120) into a motor housing (11). The electrical actuator (2) may comprise a motor housing (11), a motor (110) provided inside the motor housing (11), and a control module (120) for controlling the motor (110), wherein the control module (120) is inside the motor housing (11).

37 Claims, 8 Drawing Sheets

(51) Int. Cl.
*F16D 65/18* (2006.01)
*F16D 65/78* (2006.01)
*F16D 121/24* (2012.01)
*F16D 125/50* (2012.01)
*F16D 131/02* (2012.01)

(52) U.S. Cl.
CPC ...... *F16D 2121/24* (2013.01); *F16D 2125/50* (2013.01); *F16D 2131/02* (2013.01)

(56) References Cited

U.S. PATENT DOCUMENTS

| | | | | |
|---|---|---|---|---|
| 9,431,881 | B2* | 8/2016 | Clendenen | H02K 11/33 |
| 9,735,643 | B2 | 8/2017 | Yamasaki | |
| 10,427,709 | B2 | 1/2019 | Tomizawa | |
| 10,906,577 | B2 | 2/2021 | Urimoto | |
| 11,485,338 | B2 | 11/2022 | Yasui | |
| 2003/0083797 | A1* | 5/2003 | Yokoyama | F16D 55/226 303/20 |
| 2004/0222764 | A1* | 11/2004 | Miura | H02K 11/33 318/638 |
| 2007/0068746 | A1* | 3/2007 | Chittka | F16D 65/18 188/72.6 |
| 2008/0091326 | A1 | 4/2008 | Watanabe | |
| 2015/0001972 | A1* | 1/2015 | Miyama | H02K 9/00 310/52 |

FOREIGN PATENT DOCUMENTS

| | | |
|---|---|---|
| EP | 1 840 405 A1 | 3/2007 |
| EP | 2 995 834 A1 | 3/2016 |
| JP | 2004 502097 A | 1/2004 |
| JP | 2007 292251 A | 11/2007 |
| JP | 2008 119283 A | 5/2008 |
| JP | 2009 127737 A | 6/2009 |
| JP | 2014 75866 A | 4/2014 |
| JP | 2015 89215 A | 5/2015 |
| JP | 2017-128284 | 7/2017 |
| JP | 2017 139929 A | 8/2017 |
| WO | 2017/034253 A1 | 3/2017 |
| WO | 2017/175325 A1 | 10/2017 |

* cited by examiner

ELECTRO MECHANICAL BRAKE AND ELECTRICAL ACTUATOR THEREOF

CROSS REFERENCE TO RELATED APPLICATIONS

This application is a continuation of International Application PCT/EP2019058054 with an international filing date of Mar. 29, 2019 and claiming priority to Chinese Patent Application No. CN 201810296353.9, now CN 110319129, issued Jun. 22, 2021, entitled "Electronic mechanical brake and electric actuator thereof", filed on Mar. 30,2018.

FIELD OF THE INVENTION

The present invention relates to an electro mechanical brake for vehicles, and in particular to an electrical actuator for an electro mechanical brake.

BACKGROUND OF THE INVENTION

An electro mechanical brake (EMB) generally comprises a mechanical brake mechanism accommodated in a brake caliper to decelerate or stop a vehicle or maintain the vehicle in a stopped state. In an EMB, the mechanical brake mechanism is generally connected to an electrical actuator which includes an electric motor configured to generate and output a braking force or torque to be transmitted to the mechanical brake mechanism.

An EMB also generally comprises a control module which provides the control of the motor. For example, the control module may control the rotation of the motor and/or manage the power for the motor via various electrical connections such as cables or bus-bars. Detected signals from sensors for the motor, for example, temperature, rotational speed, etc., may be transmitted to the control module for adjusting the operation of the motor.

FIG. 1 shows a functional block diagram of a conventional EMB with an electrical actuator. In the EMB shown in FIG. 1, the brake comprises a motor 110 which is protected by a motor housing 11 and attached to a housing 21 of a caliper 20. As may be seen in the example of FIG. 1, a mechanical brake mechanism 22, a transmission unit 23, and a clamp 24 are included within the caliper 20. The mechanical brake mechanism 22 which may be connected to brake pads of the clamp 24 is housed by a housing 21, which housing 21 also accommodates the transmission unit 23. The brake force or torque generated by the motor 110 may be transmitted to the mechanical brake mechanism 22 via the transmission unit 23. The transmission unit 23 may have various force transmission structures, for example, a multiple-stage planetary gear system or a single-stage planetary gear system, for transmitting a brake force or torque to the mechanical brake mechanism 22, and thereby achieve the braking for vehicles.

In the EMB shown in FIG. 1, a control module 120 is provided in a control module housing 31 that is separate from the brake and distant from the caliper 20 and the motor housing 11. The separate control module housing 31 may be fixed to a vehicle chassis, as shown in FIG. 1. The control module 120 is arranged away from the brake, and the control module 120 is connected to the motor 110 via cables 41 therebetween.

The configuration in FIG. 1 has various shortcomings. For example, the control module 120 requires additional space and housing. Since the control module housing 31 is provided at a vehicle chassis and is arranged away from the brake, long and complicated cable connections 41 between the motor 110 and control module 120 are necessary, and the size and weight of the whole brake are large. Moreover, the structure and configuration of the brake become more complicated, and there is a problem in an aspect of vehicle packaging layout. All of the above also increase cost.

FIG. 2 shows a functional block diagram of another example of a conventional electro mechanical brake with an electrical actuator. In this example, as in FIG. 1, a motor 110 is protected by a motor housing 11 and attached to a housing 21 that houses a transmission unit 23 and the mechanical brake mechanism 22. A control module 120 is provided in a control module housing 31, but different from the EMB of FIG. 1, the control module housing 31 is attached to motor housing 11, which shortens the connections between the motor 110 and control module 120.

With regard to the configuration of FIG. 2, however, there still exist shortcomings in that the control module housing 31 may conflict with parts of the vehicle chassis when mounted onto the vehicle. Further, the additional housing and space for the control module 120 increase the size and weight of the brake, and increases costs.

FIG. 3 shows a functional block diagram of another EMB according to US Patent Publication US 2007/228824 A1. In the example of FIG. 3, the motor housing is removed, and the motor 110 is moved into the caliper 20. More specifically, the motor 110 is arranged inside a recess of housing 21, which housing also accommodates a transmission unit 23 and the mechanical brake mechanism 22. Meanwhile the control module 120 is provided in a separate control module housing 31 that is attached to the housing 21. In this case, the control module 120 must be connected to the motor 110 via cable connections 41 provided in an interface module of the control module housing 31, as disclosed in US 2007/228824 A1.

With regard to the configuration of FIG. 3, the removed motor housing may reduce the number of the components used in the brake device, and the connections between the motor 110 and the control module 120 may be shortened. However, since the control module 120 is in a separate control module housing 31, there still exists a shortcoming of conflict between the control module housing 31 and parts of vehicle chassis in vehicle packaging layout.

In all of the conventional EMB's, a separate housing for the control module is necessary. As a result, the EMB needs additional space and connections for the control module housing; thus there is a drawback that the structure configuration is complicated, conflict with parts of vehicle chassis, and increased size, weight, and costs.

Background prior art is e.g. known from US patent application US 2008/091326 A1, German utility model DE 20 2008 014 682 U1, German patent application DE 10 2007 036 070 A1, European patent application EP 2 995 834 A1, international patent application published as WO 2017/034253 A1 and European patent application EP 1 840 405 A1.

SUMMARY OF THE INVENTION

To overcome the shortcomings of a conventional EMB, the present invention provides an improved EMB with an electrical actuator which can provide a reduced size and a simplified structure configuration.

According to one aspect of the invention, an electrical actuator for an EMB is disclosed. The electrical actuator comprises a motor housing, a motor provided inside the motor housing and a control module for controlling the motor, wherein the control module is inside the motor housing.

In an aspect, the control module may be attached to the motor housing.

In an aspect, the control module may comprise at least a first printed circuit board (PCB) provided with a control circuit for controlling the motor. The at least a first PCB may further comprise a power management circuit for managing power to the motor. The control module may further comprise a support element for holding the at least one first PCB. The support element may be integral with the motor housing, such as a flange, or may be a separate element.

In another aspect, the control module may comprise at least one second PCB configured to manage power supply for the motor. The at least one first and second PCBs may be stacked and fixed to one side of a support element for holding the first and second PCBs, or may be fixed to opposite sides of the support element. The support element may be integral with the motor housing, such as a flange, or may be a separate element.

In an aspect according to any of the above configurations, each PCB and the support element may have an annular shape with a center through-hole through which a drive shaft of the motor may extend. The support element may have an annular projection that projects from the center through-hole for holding and fixing a bearing therein. The support element may be configured for cooling components on a printed circuit board; for example, the support element may be made from a thermally conductive metal.

In an aspect according to any of the above configurations, the control module may further comprise at least one capacitor connected to at least one PCB. The at least one capacitor may be attached to a side cover that covers a side of the motor housing and/or may be configured as a separate assembly attached to at least one PCB.

In configurations wherein the control module comprises at least one first and second PCB, the at least one first PCB may be electrically connected to the at least one second PCB via one of board-to-board connectors or cables.

In an aspect according to any of the above configurations, the electrical actuator may further comprise a permanent magnetic brake fixed on the support element.

In an aspect according to any of the above configurations, the electrical actuator may further comprise a side cover for covering a side of the motor housing. The side cover may have an annular projection for guiding a drive shaft of the motor. The motor housing may include at least one cable channel thereon. The side cover may include at least one hole through which the cables may be passed.

In an aspect to any of the above configurations, the motor housing may have a hollow cylindrical shape. The motor housing may be made from a thermally conductive metal. The motor housing may be provided with fins, flanges, or surface enlargements on the outer surface thereof.

According to another aspect of the invention, there is provided an EMB comprising the electrical actuator according to any configuration above. The EMB may further comprise a mechanical brake mechanism directly or indirectly driven by the motor of the electrical actuator. The mechanical brake mechanism may be arranged within a disc brake caliper, such as, a sliding caliper disc brake or a fixed caliper disc brake. The mechanical brake mechanism may be arranged within a drum brake. The EMB may further comprise a transmission unit comprising gears, such as planet gears, and being provided between the mechanical brake mechanism and the electrical actuator, wherein the mechanical brake mechanism may be driven by the transmission unit.

Advantageous developments of the invention result from the claims, the description and the drawings. The advantages of features and of combinations of a plurality of features mentioned at the beginning of the description only serve as examples and may be used alternatively or cumulatively without the necessity of embodiments according to the invention having to obtain these advantages. Without changing the scope of protection as defined by the enclosed claims, the following applies with respect to the disclosure of the original application and the patent: further features may be taken from the drawings, in particular from the illustrated designs and the dimensions of a plurality of components with respect to one another as well as from their relative arrangement and their operative connection. The combination of features of different embodiments of the invention or of features of different claims independent of the chosen references of the claims is also possible, and it is motivated herewith. This also relates to features which are illustrated in separate drawings, or which are mentioned when describing them. These features may also be combined with features of different claims. Furthermore, it is possible that further embodiments of the invention do not have the features mentioned in the claims.

The number of the features mentioned in the claims and in the description is to be understood to cover this exact number and a greater number than the mentioned number without having to explicitly use the adverb "at least". For example, if an element is mentioned, this is to be understood such that there is exactly one element or there are two elements or more elements. Additional features may be added to these features, or these features may be the only features of the respective product.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

FIG. 8b is an exploded view of the control module from FIG. 8a.

DETAILED DESCRIPTION

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Figure 1:
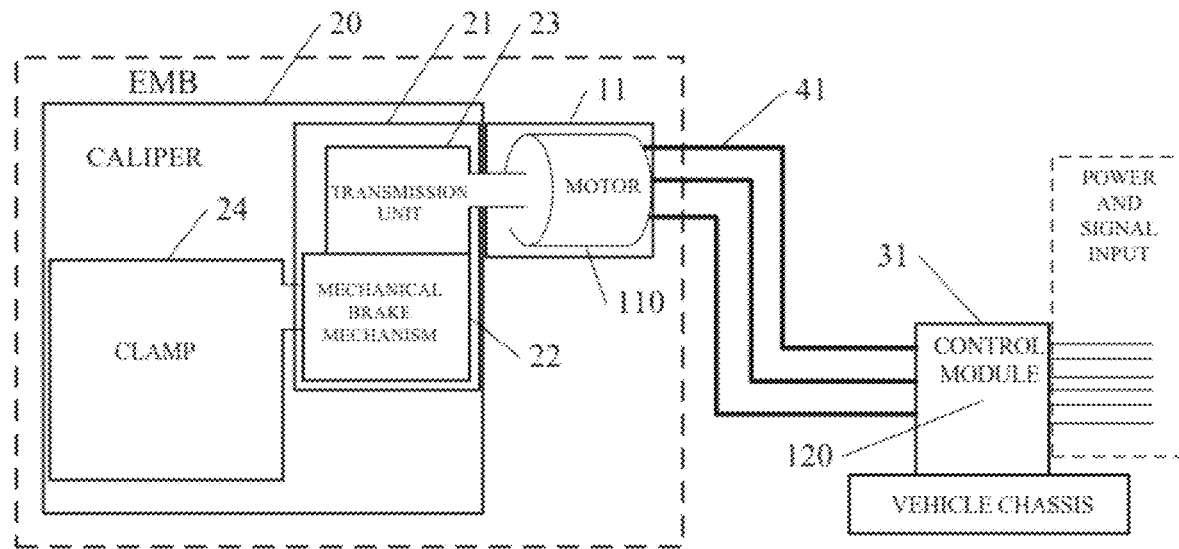
FIG. 1 shows a functional block diagram of an example of a conventional electro mechanical brake with an electrical actuator according to the prior art.
Figure 2:
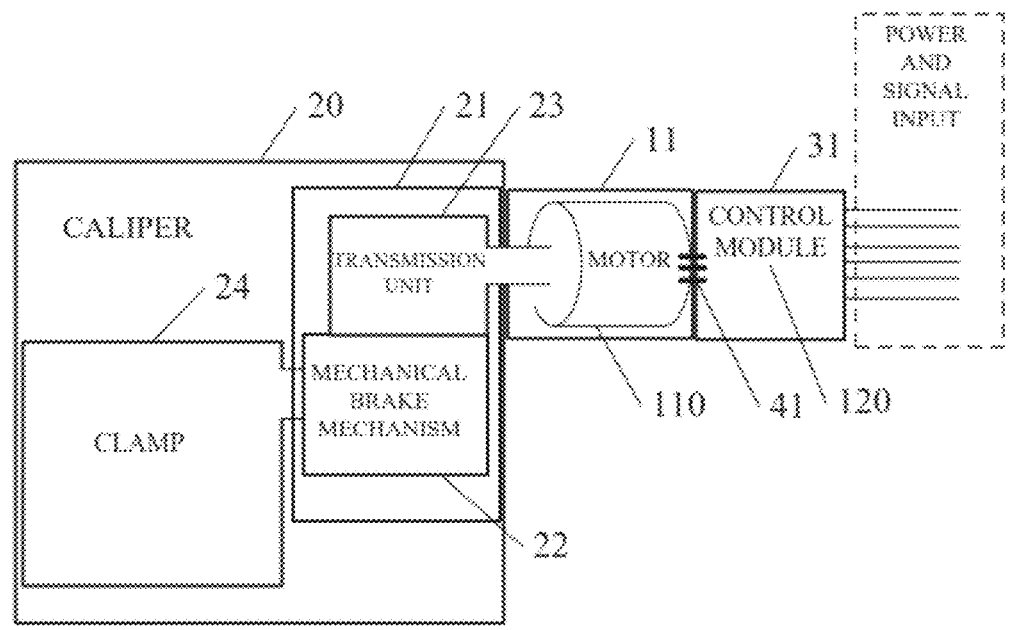
FIG. 2 shows a functional block diagram of another example of a conventional electro mechanical brake with an electrical actuator according to the prior art.
Figure 3:
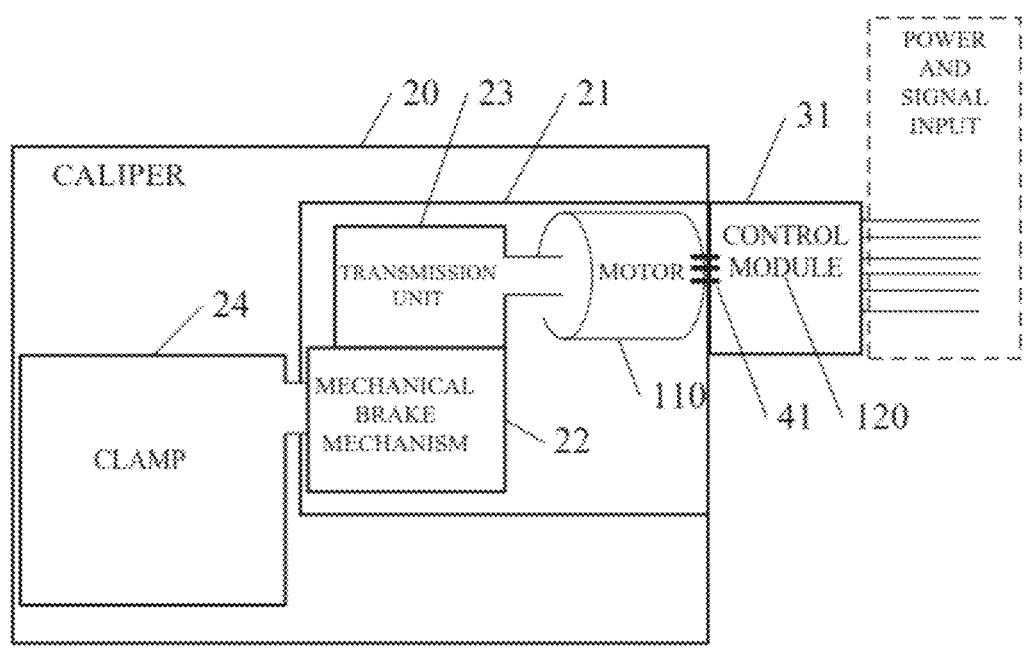
FIG. 3 shows a functional block diagram of an example of an electro mechanical brake according to the prior art.
Figure 4:
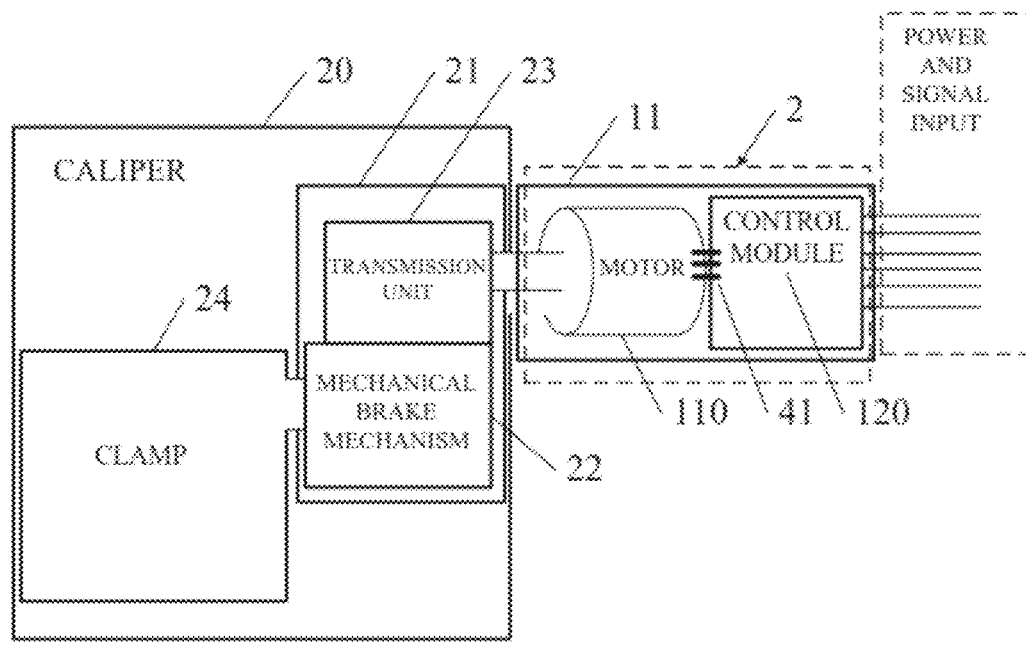
FIG. 4 shows a functional block diagram of an improved electro mechanical brake according to the present invention.

FIG. 4 shows a functional block diagram of an improved EMB according to the present invention. As shown in FIG. 4, the EMB comprises an electrical actuator 2 including a motor 110 which is protected by a motor housing 11. A control module 120 is provided inside the motor housing 11. The motor housing 11 is attached to a housing 21 which may house a transmission unit 23 and a mechanical brake mechanism 22. Since the control module 120 is integrated inside motor housing 11 and is arranged close to the motor 110, the connections 41 between the motor 110 and the control module 120 are shortened, and the structure of the whole brake is simplified.

Figure 5:
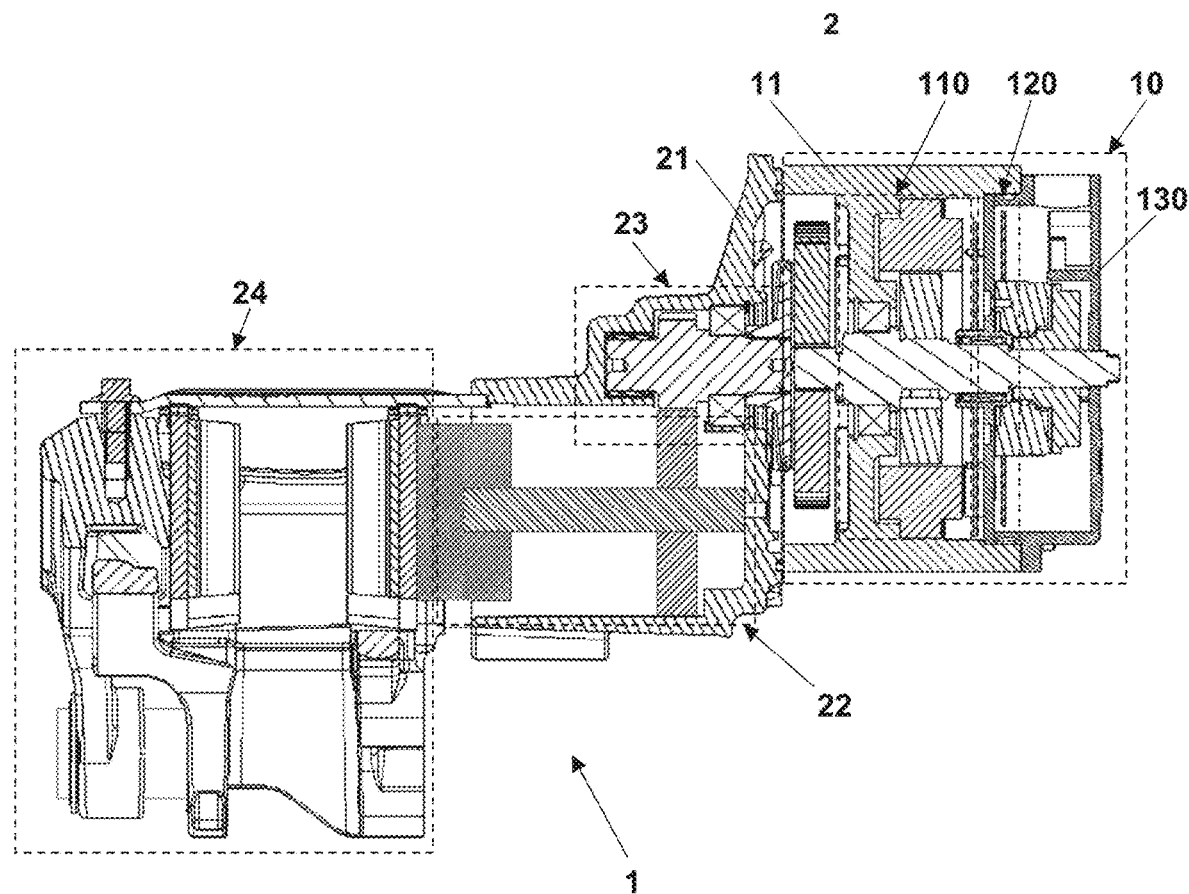
FIG. 5 is a cross-sectional view of an electro mechanical brake with an electrical actuator.

FIG. 5 illustrates an example of an EMB 1 with an electrical actuator 2 according to one or more aspects of the present invention.

In the example illustrated in FIG. 5, the EMB 1 includes an electrical actuator 2 provided with a motor 110 and a control module 120, both the motor 110 and the control module 120 being inside a motor housing 11.

Figure 6:
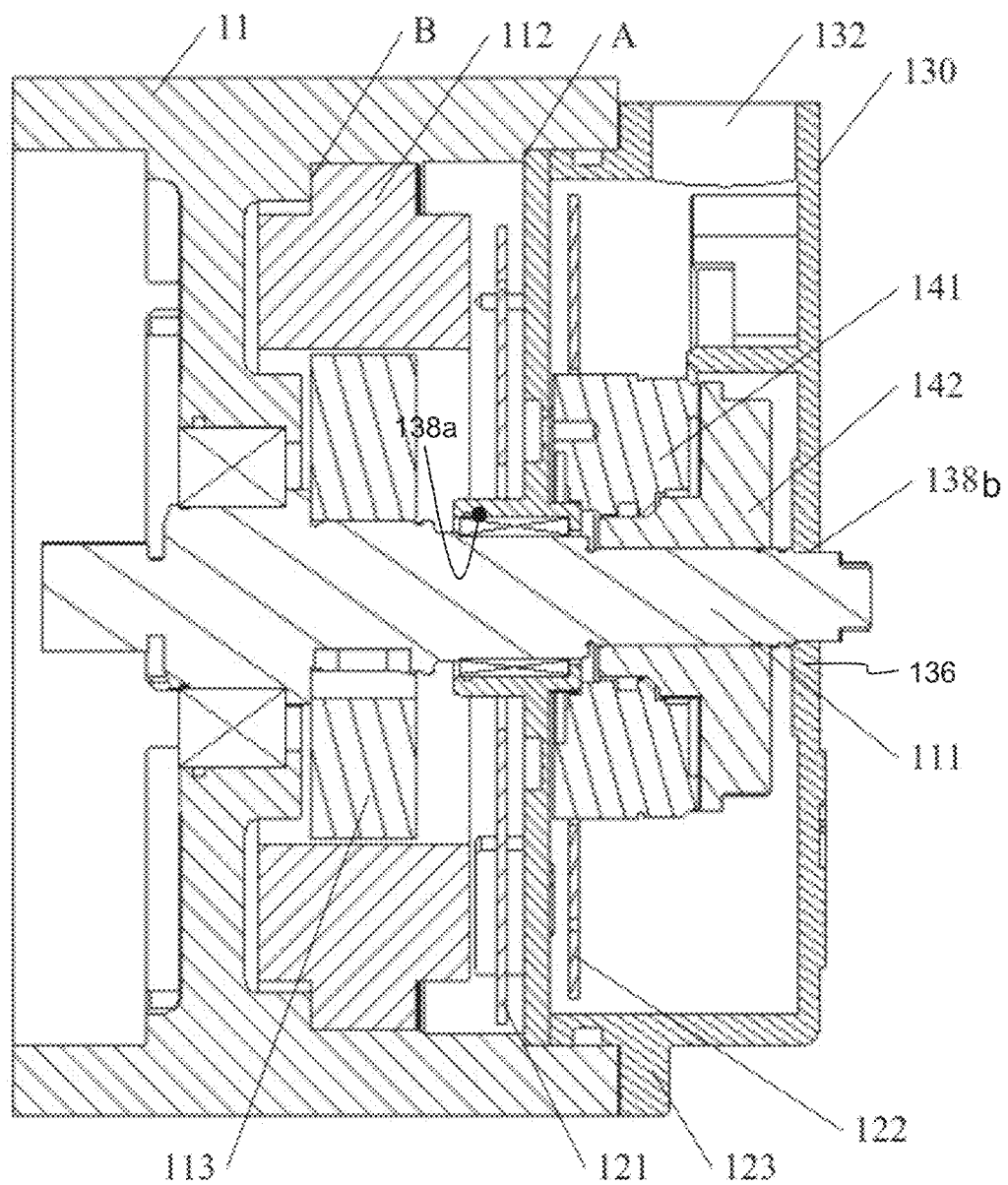
FIG. 6 is an enlarged cross-sectional view of the electrical actuator in FIG. 5.

FIG. 6 shows an enlarged cross-sectional view of a portion of FIG. 5 inside box 10 of FIG. 5.

Figure 7:
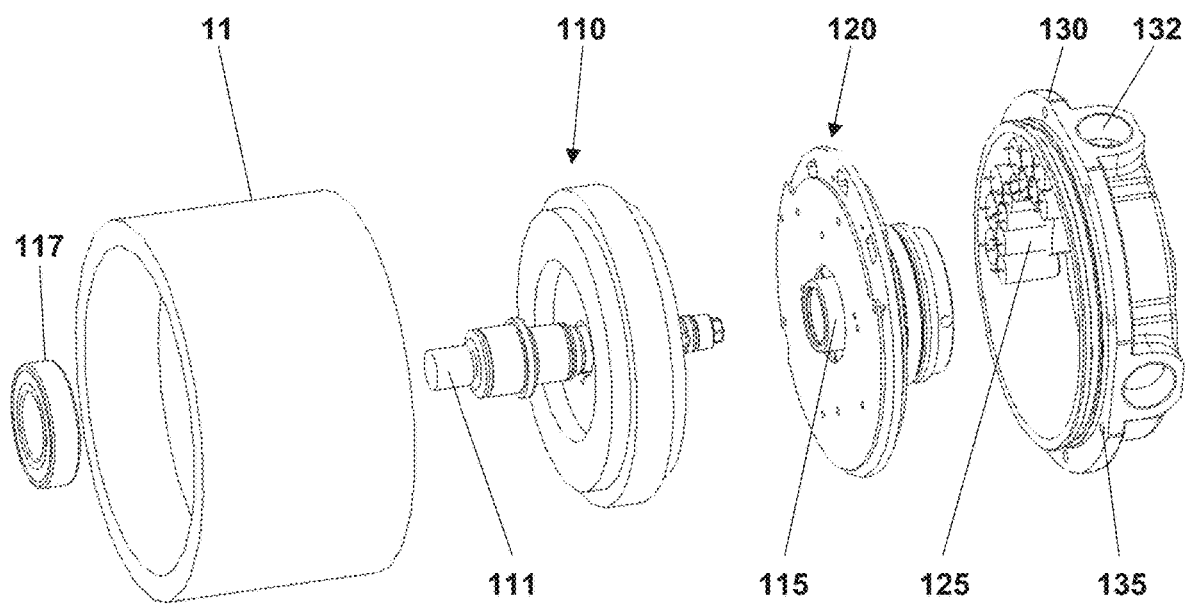
FIG. 7 is an exploded view of components of the electrical actuator in FIG. 6.

FIG. 7 is an exploded view of the electrical actuator as illustrated in FIG. 6, further including a side cover 130.

Figure 8A:
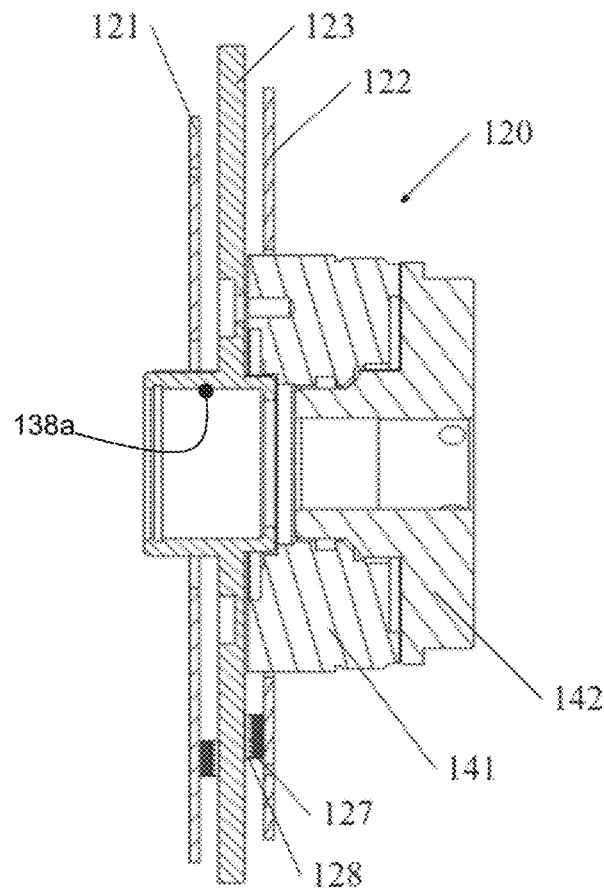
FIG. 8a is an enlarged cross-sectional view of a control module in the electrical actuator.

FIG. 8a is an enlarged cross-sectional view of a control module 120 in the electrical actuator according to the present invention.

Figure 8B:
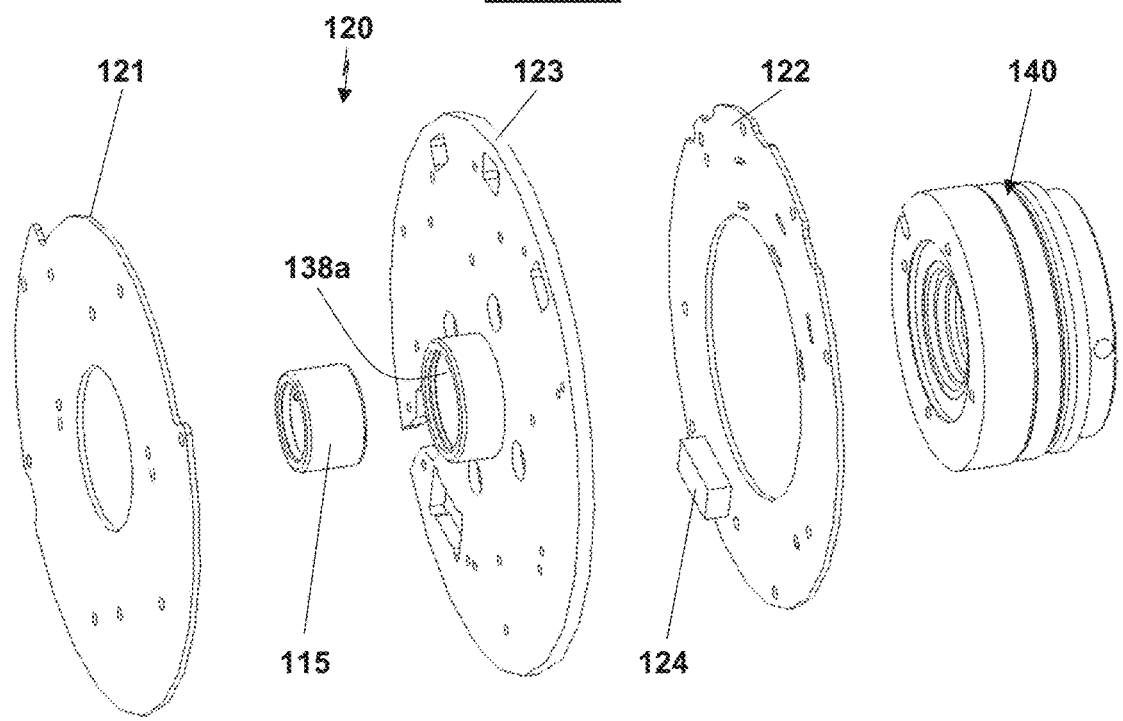

FIG. 8b is an exploded view of the control module 120 from FIG. 8a.

With reference to FIGS. 5, 6, 7, 8a, and 8b, the control module 120 of the present invention is not provided in a separate housing separated from a motor. Instead, the control module 120 of the present invention is arranged inside the motor housing 11 together with the motor 110. By removing the separate housing for the control module and integrating the control module 120 into the motor housing 11, the EMB of the present invention may have a simplified structure, and the size of the whole brake may be further reduced.

Hereinafter, an embodiment of the control module 120 integrated inside the motor housing 11 according to the present invention will be discussed with reference to FIG. 8a and FIG. 8b.

As illustrated in FIG. 8a and FIG. 8b, the control module 120 may include at least a first printed circuit board (PCB) 121 provided with a control circuit for controlling the motor. The first PCB may also be referred to as a "control PCB". Though only one control PCB 121 is shown in FIG. 8b, the control module 120 may have more than one control PCB.

The at least one first PCB 121 may be further provided with a power management circuit for managing power to the motor 110. Alternatively or in addition, the control module 120 may comprise at least one second PCB 122 provided with a power management circuit for managing power to the motor 110. The second PCB 122 may also be referred to as a "power PCB". Though only one power PCB 122 is shown in FIG. 8b, the control module 120 may have more than one power PCB 122.

Though the illustration of FIG. 8b shows both the first PCB 121 and the second PCB 122, in an example, the control module 120 may have only one PCB, e.g., the first PCB 121 which may be provided with both the control circuit and the power managing circuit. In such case, there would, for example, be no additional PCB such as the second PCB 122. This allows the structure of the control module 120 to be simplified as far as possible, avoiding additional space.

The control module 120 described in any embodiment herein may further comprise a support element 123, wherein the at least one first PCB 121 may be attached to the support element 123. For example, as illustrated in FIG. 8b, a support element 123 is provided, and the first PCB 121 and second PCB 122 may be attached to the support element 123, for example by screws or other fastening means. In the case that the control module 120 includes only one PCB, e.g., the first PCB 121, the first PCB 121 may be attached on either side of the support element 123.

Preferably, each PCB and the support element 123 may have an annular shape with a center through-hole 138a through which a drive shaft 111 of the motor 110 may be extended. The annular PCB or PCBs 121, 122 and annular support element 123 provide the possibility for maximization of space utilization inside the motor housing 11, and thereby the size and weight of the whole electrical actuator 2 may be reduced.

In an aspect, the simplified structure configuration inside the motor housing 11 may minimize the cost of the whole electro mechanical brake 1. In another aspect, the positioning of the one or more PCBs 121, 122 and the support element 123 inside the motor housing 11 may shorten connections between the control module 120 and the motor 110, and thereby may eliminate the risk of conflict with other parts of the vehicle.

Also, due to the annular shape of the one or more PCBs 121, 122 and support element 123, the control module 120 can be installed integrally with a drive shaft 111 or motor shaft in various ways, which will be described below.

For example, as shown in the embodiment of FIG. 8a and FIG. 8b, the at least a first PCB 121 and the at least a second PCB 122 may be arranged on opposite sides of the support element 123 in a direction along the length of the motor shaft or drive shaft 111. In such case, either one of the first PCB 121 or the second PCB 122 may be fixed to the side of the support element 123 facing the motor 110, with the other of the first PCB 121 or second PCB 122 being fixed to the opposite side of the support element 123.

Figure 10:
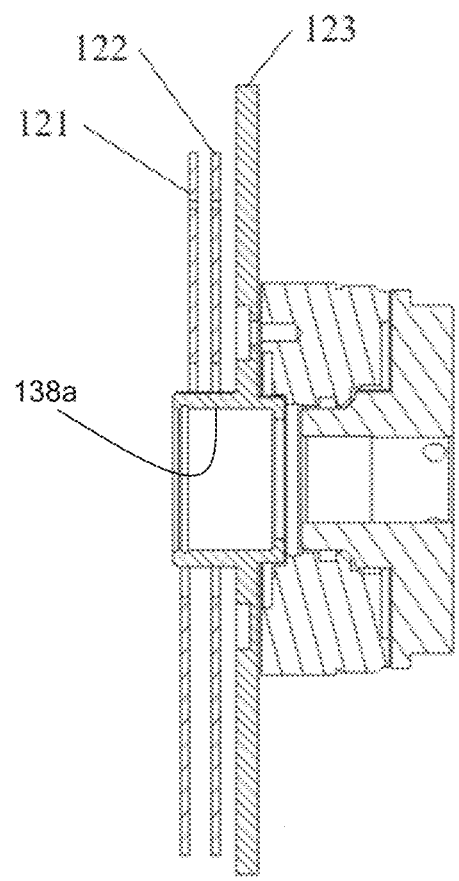
FIG. 10 is an example of a control module with printed circuit boards arranged at the same side of a support element.

In other examples, the at least one first PCB 121 and the at least one second PCB 122 may be stacked and fixed to one side of the support element 123. FIG. 10 shows an example embodiment wherein a first PCB 121 and a second PCB 122 may be stacked and fixed to one side of the support element 123, via screws or any other suitable fastening means. In implementations where at least one first PCB 121 and at least one second PCB 122 are stacked and fixed to one side of the support element 123, the PCBs 121, 122 may be fixed to the side of the support element 123 facing the motor 110, or to the side of the support element 123 facing away from the motor 110.

In implementations wherein the control module 120 comprises more than one PCB 121, 122, the PCBs 121, 122 may be electrically connected, for example, via at least one board-to-board connector 124, as shown in FIG. 8b, and/or at least one cable. The board-to-board connector 124 may shorten the electrical connections between the PCBs 121, 122, and thus, eliminate additional space for cables or other connectors and increase structural stability.

For an alternative embodiment instead of board-to-board connectors or cables, in the case of more than one PCB 121, 122, at least one busbar is used to electrically connect PCBs 121, 122. The busbar may be formed as a sheet or bar-shaped metal body, e.g., a copper sheet, a copper alloy sheet, etc.; of course, it is not limited to the metal electrically conductive bodies above; the busbar may also be formed by a non-electrically-conductive substrate attached with an electrically conductive layer, e.g., the non-electrically-conductive substrate is attached with an electrically conductive silver paste, an electrically conductive printing ink, etc.

In any embodiment described herein, support element 123 may have an annular projection that projects from the center through-hole for holding and fixing a bearing. For example, as illustrated in FIG. 8b, support element 123 may include a center through hole 138a for holding and fixing bearing 115 therein. In the illustration shown in FIG. 8b, the bearing 115 may be a needle bearing. The bearing 115 may be configured for supporting and guiding the drive shaft 111.

In embodiments of the present invention described herein, the motor housing 11 may be made from metal. Preferably, the motor housing 11 may be made from thermally conductive materials. For example, the motor housing 11 may be made from aluminum, since aluminum provides good thermal conductivity, which is favorable for heat dissipation of the motor 110. In other embodiments, the motor housing 11 may be made from other suitable thermally conductive materials, such as steel or magnesium.

Preferably, the motor housing 11 may also be configured for improving thermal dissipating properties. For example, the motor housing 11 may be provided with fins, flanges or surface enlargements on the outer surface thereof. By providing such structures, it is possible to increase the outer surface of the motor housing 11 exposed to the ambient air, so as to dissipate the heat into the air.

The electrical actuator 2 according to any embodiment of the present invention described herein may further comprise a side cover 130 for covering a side of the motor housing 11, as shown in FIG. 6. The side cover 130 may be configured for sealing the side of the motor housing 11. The side cover 130 may be fixed to the motor housing 11, for example, via screws or other fastening means, such as through holes 135 as shown in FIG. 7.

Where a side cover 130 is included, the side cover 130 may preferably include an annular projection 136 for guiding the drive shaft 111 of the motor. For example, in an example embodiment, the side cover 130 may include an annular projection 136 which defines and project s from a center through-hole 138b of the side cover 130 for holding and fixing, for example, a shaft sealing (not shown) therein, the shaft sealing being used for sealing the end of the drive shaft 111 of the motor 110 at the side cover 130. In such embodiment, the annular projection 136 of the side cover 130 may have a stepped inner surface such that the shaft sealing may be arranged against the stepped inner surface of the annular projection 136 at center through-hole 138b. The annular projection 136 may further allow for a cap to be mounted to enclose the center through-hole 138b of the side cover 130.

The motor housing 11 may be any shape and may have a central recess for guiding the drive shaft 111 of the motor 110. In preferred embodiments, the motor housing 11 may have a hollow cylindrical shape.

In an aspect of the present invention, the control module 120 may be attached to an interior wall of the motor housing 11. For example, the inner surface of the motor housing 11 may be provided with an annular flange, and support member 123 of the control module 120 may be attached to the flange, which in turn connected to or integral with the motor housing 11.

In preferred embodiments, the motor housing 11 includes features for mounting the support element 123 of the control module 120. For example, as shown in FIG. 6, the motor housing 11 may have a stepped inner surface A, such that the support element 123 may be mounted inside the motor housing 11 by being pressed against the stepped inner surface A. In this embodiment, the control module 120 may be first mounted inside the motor housing 11 and pressed by the side cover 130 during installation or assembly. In this way, the control module 120 can be positioned inside the motor housing 11 and fixed by the side cover 130.

In preferred embodiments, the side cover 130 may be configured for cooling the control module 120. For example, the side cover 130 may be made of thermally conductive materials such as aluminum, steel, magnesium or other thermally conductive metals and/or the side cover 130 may be provided with fins, flanges, or surface enlargements on the outer surface thereof.

The control module 120 as described in any embodiment herein may further comprise at least one capacitor 125. The at least one capacitor 125 may be connected to at least one PCB 121, 122 of the control module 120. For example, by way only of illustration and not of limitation, FIG. 6 illustrates at least one capacitor 125 connected to at least one PCB of a control module 120. The capacitor 125 may, for example, be configured for noise reduction during operation and improve power supply stability.

In any of the embodiments that include a side cover 130, the at least one capacitor 125 of the control module 120 may be attached to the side cover 130. For example, as illustrated by way of example and not of limitation, FIG. 6 illustrates at least one capacitor 125 being attached to side cover 130. Alternatively or in addition, at least one capacitor 125 may be configured as a separate assembly attached to at least one PCB.

In any embodiment disclosed herein having a support element 123, the support element 123 may be configured as a substantially flat, annular plate. In any embodiment disclosed herein having a support element 123, the support element 123 may be integral with the motor housing 11, or may be a separate element. In some examples, the support element 123 may be a flange used for supporting the motor 110. In other examples, the support element 123 may be a separate element fixed to the motor housing 11.

In any embodiment disclosed herein having a support element 123, the support element 123 may be configured for cooling components on one or more of the PCBs 121, 122. In some examples, the support element 123 may be made from metal, such as aluminum, steel, magnesium or other thermally conductive materials. In any embodiment disclosed herein having at least one PCB 121, 122 attached to a support element 123, electronic components on the PCB 121, 122 may be cooled by thermally conductive materials between the electronic components and the support element 123.

For example, FIG. 8a shows an electronic component 127 on a PCB, which may introduce heat onto the PCB 121, 122 during operation. In such case, a thermally conductive gasket 128 made from thermally conductive materials may be inserted between the electronic component 127 and the support element 123, so that the heat introduced by the electronic component 127 may be conducted to the support element 123 through the gasket 128.

The thermally conductive gasket 128 may be made from any suitable thermal conductive material, such as silicone, polyurethane, and acrylic resins. In some embodiments, one or more thermally conductive gaskets 128 may be also arranged onto the inner surface of motor housing 11 for improving thermal dissipation properties.

Preferably, the thermally conductive gasket 128 may have strong adhesive properties, such that the gasket 128 may be firmly adhesive to the surface of the components. In some embodiments where the support element 123 may be configured for supporting PCBs 121, 122 of the control module 120 and/or other components, preferably, the support element 123 may be made from materials which may provide an improved supporting strength and good thermally conductive properties, such as aluminum alloy.

In any embodiment described herein, the electrical actuator 2 according to the present invention may comprise an electromagnetic brake which may be fixed on the support element 123. The electromagnetic brake may be configured as a permanent magnetic brake or a non-permanent magnetic brake.

For example, FIGS. 6 and 8b illustrate a permanent magnetic brake 140 fixed on the support element 123. In some embodiments, the permanent magnetic brake 140 may comprise a stator 141 which may be fixed to the support element 123 via screws, as shown in FIG. 6, and a rotor 142. The permanent magnetic brake 140 may provide for a brake torque for the drive shaft 111. The control module 120 may be connected to the permanent magnetic brake 140 via connections and may be configured to control the operation modes of the permanent magnetic brake 140. For example, in some embodiments, the control module 120 may control the power supplied to the permanent magnetic brake 140. For example, when the permanent magnetic brake 140 is powered off, the permanent magnetic 140 may generate a brake torque to stop the rotation of the drive shaft 111. When the permanent magnetic brake 140 is powered on, the brake for the drive shaft 111 may be released. The electromagnetic brake operated in this way is also known as "power-off brake". Alternately, the brake 140 in any embodiment disclosed herein may be configured as a non-permanent magnetic brake. The non-permanent magnetic brake may be operated as "power-off brake" or operated in other suitable ways.

In an aspect, as shown in FIGS. 5-7, the motor 110 may include a drive shaft 111, a motor stator 112, and a motor rotor 113. The drive shaft 111 may be connected to motor rotor 113, and the motor stator 112 may be attached to the motor housing 11. For example, as shown in FIG. 6, the motor stator 112 may be mounted onto a stepped inner surface B of the motor housing 11.

The output end of the drive shaft 111 may extend through one side of the motor housing 11 for outputting the force or torque to drive a mechanical brake mechanism 22. In the embodiments where a permanent magnetic brake 140 is included, as shown in FIG. 6, the drive shaft 111 may extend through the permanent magnetic brake 140. In such case, the drive shaft 111 may be connected to a rotor 142 of the permanent magnetic brake 140.

Preferably, the drive shaft 111 may be mounted with two bearings, such as bearings 115 and 117 as shown in FIG. 7. Bearings 115 and 117 may be any suitable types of bearings for guiding the drive shaft 111, such as needle bearings. The bearing 117 may be arranged close to the output end of the drive shaft 111 at one side of the motor housing 11, as shown in FIG. 6 and FIG. 7.

Preferably, the input end of the drive shaft 111 may have a hexagon shape, as shown in FIG. 7. In such case, a universal hexagon wrench can be used by a user for the drive shaft 111, from the center through-hole 138b of the side cover, during maintenance period or in an emergency braking state, without removing components inside the motor housing 11.

The drive shaft 111 may be rotated to generate a brake force that is to be transmitted to a mechanical brake mechanism 22 in FIG. 5. The control module 120 may manage power supplied to the motor 110 through power connections.

In an aspect of any embodiment of the invention described herein, the electrical actuator 2 according to the present invention may comprise a sensing module (not shown) for sensing the operation state of the motor 110. The sensing module may comprise at least one sensor. In such case, the control circuit of the control module 120 may receive signals, indicating the operation state of the motor 110, from the sensing module, and adjust the operation state of the motor 110 in response to the detected signals. These signals may involve temperature, angle, torque, or speed of the motor 110. The control module 120 may also receive the inputs indicating the power state of the motor 110. In response to these power state inputs, the control module 120 may adjust the power state for the motor 110 to a desired state.

In some examples, one or more sensors may be arranged close to or on the motor 110. Signals detected by the sensors may be transmitted to the control module 120 for adjusting the operation manner of the motor 110 in response to the detected signals. The sensors may be used to detect temperature, angle, torque, speed, etc. of the motor 110 in operation.

Figure 9:
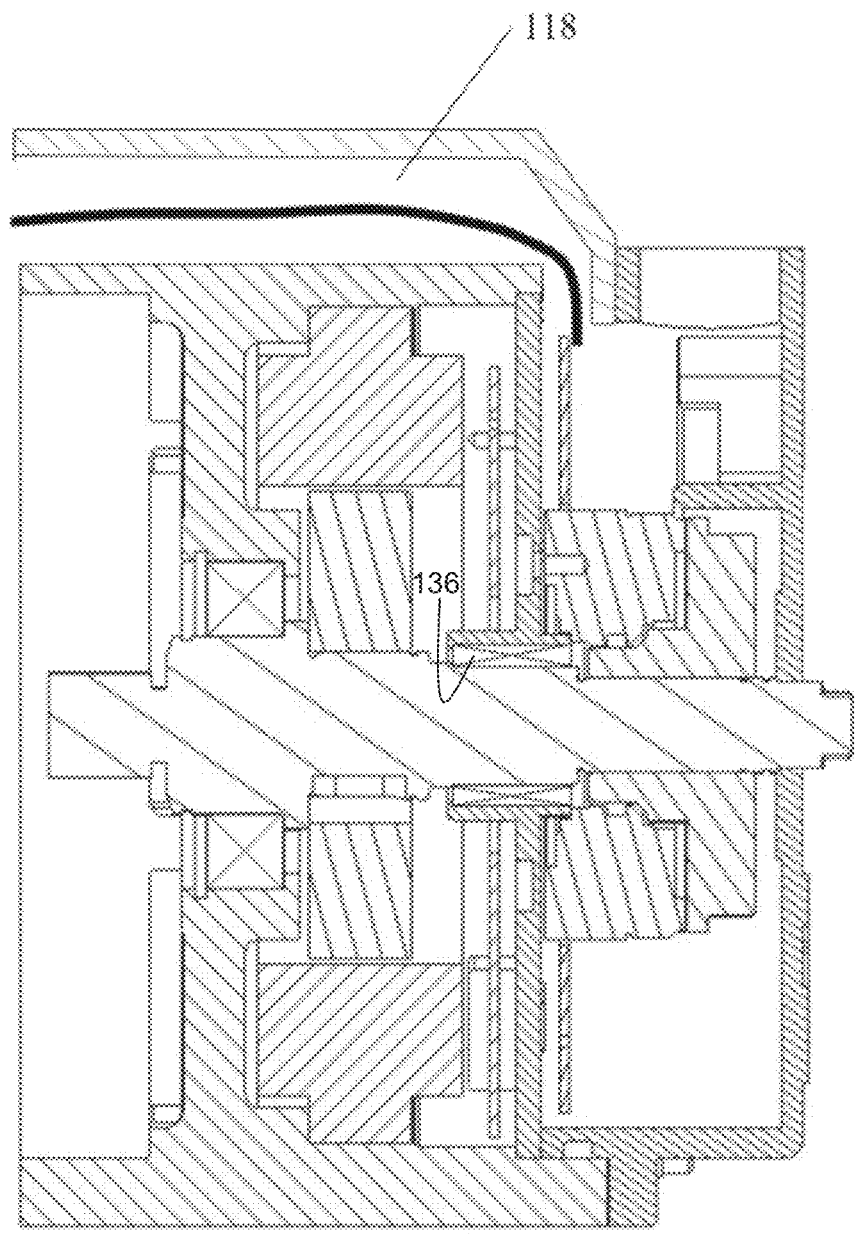
FIG. 9 is an enlarged view of an example of a cable channel provided on or in a motor housing.

In any embodiment described herein, the motor housing 11 may include at least one cable channel 118 provided thereon, as shown in FIG. 9. Cables may be fixed and extended through the cable channel 118 provided on the motor housing 11. Optionally or alternatively, the side cover 130 may include at least one hole 132 through which the power and signal inputs out of the motor housing 11 may be passed into the inside of the motor housing 11, as shown in FIGS. 6 and 7.

The integrated electrical actuator 2 in accordance with the present invention may be mounted in connection with a mechanical brake mechanism 22 and/or a transmission unit 22. The mechanical brake mechanism 22 may be directly or indirectly driven by the motor 110 of the integrated electrical actuator 2.

Optionally, in some embodiments, the electro mechanical brake 1 may comprise a transmission unit 23 provided between the mechanical brake mechanism 22 and the electrical actuator 2, as shown in FIG. 5. In the embodiment of FIG. 5, during the operation, the transmission unit 23 may be directly driven by the output of the motor 110 so as to transmit a brake force to the mechanical brake mechanism 22, and thereby, the mechanical brake mechanism 22 may be indirectly driven by the motor 110.

The transmission unit 23 may be attached to the motor housing 11 for receiving and transmitting the brake force or torque output of the drive shaft 111 to the mechanical brake mechanism 22. For example, the transmission unit 23 may be accommodated together with the mechanical brake mechanism 22 inside a housing 21, as shown in FIG. 5. The electrical actuator 2 may be attached to the housing 21, and thereby connected to the transmission unit 23.

Though FIG. 5 shows an example of the transmission unit 23 which is configured as a two-stage gear transmission structure using planet gears, in other embodiments, the transmission unit 23 may be configured to have any other suitable transmission structures, such as, a single stage gear transmission structure, a cycloidal gear transmission, a worm gear set, etc.

Optionally, in some embodiments, the integrated electrical actuator 2 in accordance with the present invention may be mounted directly in connection with the mechanical brake mechanism 22 without the transmission unit therebetween, such that the mechanical brake mechanism 22 may be directly driven by the motor.

Of course, while a specific sliding disc brake caliper is shown in FIG. 5, the EMB 1 described in any embodiment herein may also be implemented in other types of brake caliper, for example, in a fixed disc brake caliper or in a drum brake.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Many variations and modifications may be made to the preferred embodiments of the invention without departing substantially from the spirit and principles of the invention. All such modifications and variations are intended to be included herein within the scope of the present invention, as defined by the following claims.

We claim:

1. An electrical actuator for an electro mechanical brake, comprising:
a motor housing;
a motor provided inside the motor housing;
a control module for controlling the motor, wherein the control module is inside the motor housing, the control module comprising at least a first printed circuit board provided with a control circuit for controlling the motor, a support element for holding the at least first printed circuit board, and wherein the at least first printed circuit board and the support element each have an annular shape with a center through-hole through which a drive shaft of the motor may be extended; and
an electromagnetic brake fixed on the support element, wherein the electromagnetic brake is configured to generate a brake torque to stop the rotation of the drive shaft of the motor.

2. The electrical actuator according to claim 1, wherein: the control module is attached to the motor housing.

3. The electrical actuator according to claim 2, wherein: the at least first printed circuit board further comprises a power management circuit for managing power to the motor.

4. The electrical actuator according to claim 3, wherein: the at least first printed circuit board is fixed to one side of the support element.

5. The electrical actuator according to claim 1, wherein: the control module further comprises at least a second printed circuit board configured to manage power supply for the motor; and the support element is configured to hold at least the first and second printed circuit board.

6. The electrical actuator according to claim 5, wherein: the at least first and second printed circuit board are stacked and fixed to one side of the support element.

7. The electrical actuator according to claim 5, wherein: the at least first and second printed circuit board are fixed to opposite sides of the support element.

8. The electrical actuator according to claim 5, wherein: the second printed circuit board has an annular shape with a center through-hole through which the drive shaft of the motor may be extended.

9. The electrical actuator according to claim 5, wherein: the second printed circuit board and the support element have an annular shape with a center through-hole through which the drive shaft of the motor may be extended.

10. The electrical actuator according to claim 9, wherein: the support element is a flat plate.

11. The electrical actuator according to claim 9, wherein: the support element has an annular projection that projects from the center through-hole for holding and fixing a bearing therein.

12. The electrical actuator according to claim 1, wherein: the control module further comprises at least one capacitor connected to at least one printed circuit board.

13. The electrical actuator according to claim 12, wherein: the electrical actuator further comprises a side cover for covering a side of the motor housing.

14. The electrical actuator according to claim 13, wherein: the at least one capacitor is attached to the side cover.

15. The electrical actuator according to claim 12, wherein: the at least one capacitor is configured as a separate assembly attached to at least one printed circuit board.

16. The electrical actuator according to claim 5, wherein: the first printed circuit board is electrically connected to the second printed circuit board via board-to-board connectors, cables or busbars.

17. The electrical actuator according to claim 4, wherein; the support element is integral with the motor housing.

18. The electrical actuator according to claim 5, wherein: the support element is integral with the motor housing.

19. The electrical actuator according to claim 17, wherein: the support element is a flange.

20. The electrical actuator according to claim 18, wherein: the support element is a flange.

21. The electrical actuator according to claim 4, wherein: the support element is a separate element fixed to the motor housing.

22. The electrical actuator according to claim 5, wherein: the support element is a separate element fixed to the motor housing.

23. The electrical actuator according to claim 4, wherein: the support element is configured for cooling components on a printed circuit board.

24. The electrical actuator according to claim 5, wherein; the support element is configured for cooling components on a printed circuit board.

25. The electrical actuator according to claim 23, wherein: the support element is made from a thermally conductive metal.

26. The electrical actuator according to claim 24, wherein: the support element is made from a thermally conductive metal.

27. The electrical actuator according to claim 13, wherein: the side cover has an annular projection for guiding the drive shaft of the motor.

28. The electrical actuator according to claim 1, wherein: the motor housing has a hollow cylindrical shape.

29. The electrical actuator according to claim 1, wherein: the motor housing is made from a thermally conductive metal.

30. The electrical actuator according to claim 1, wherein: the motor housing includes at least one cable channel thereon.

31. The electrical actuator according to claim 13, wherein: the side cover includes at least one hole.

32. An electro mechanical brake, comprising:
an electrical actuator according to claim 1, and
a mechanical brake mechanism directly or indirectly driven by the motor.

33. The electro mechanical brake according to claim 32, wherein:
the mechanical brake mechanism is arranged within a drum brake.

34. The electro mechanical brake according to claim 32, wherein:
the mechanical brake mechanism is arranged within a disc brake caliper.

35. The electro mechanical brake according to claim 32, further comprising:
a transmission unit provided between the mechanical brake mechanism and the electrical actuator, wherein the mechanical brake mechanism is driven by the transmission unit.

36. The electro mechanical brake according to claim 35, wherein;
the transmission unit comprises gears.

37. The electro mechanical brake according to claim 36, wherein:
the gears are planet gears.

* * * * *

UNITED STATES PATENT AND TRADEMARK OFFICE
CERTIFICATE OF CORRECTION

PATENT NO. : 12,117,057 B2
APPLICATION NO. : 17/035915
DATED : October 15, 2024
INVENTOR(S) : Gang Wu et al.

It is certified that error appears in the above-identified patent and that said Letters Patent is hereby corrected as shown below:

In the Specification

Column 1, Line 8:
"PCT/EP2019058054" should be — PCT/EP2019/058054 —

Column 1, Line 9:
After "to" insert -- co-pending --

Column 7, Line 29:
"through hole" should be — through-hole —

Column 7, Line 55:
"through holes" should be — through-holes —

Column 7, Line 61:
"project s" should be — projects —

Column 8, Line 15:
After "turn" insert -- is --

Column 9, Line 47:
After "magnetic" insert -- brake --

In the Claims

Column 12, Claim 5, Line 19:
"board" should be — boards —

Column 12, Claim 6, Line 21:
"board" should be — boards —

Signed and Sealed this
Twenty-fifth Day of February, 2025

Coke Morgan Stewart
*Acting Director of the United States Patent and Trademark Office*

Column 12, Claim 7, Line 24:
"board" should be — boards —